Jan. 15, 1952 — C. I. LEVEKE — 2,582,595
ADJUSTABLE TONGUE FOR MOTORLESS VEHICLES
Filed Oct. 31, 1949 — 2 SHEETS—SHEET 1
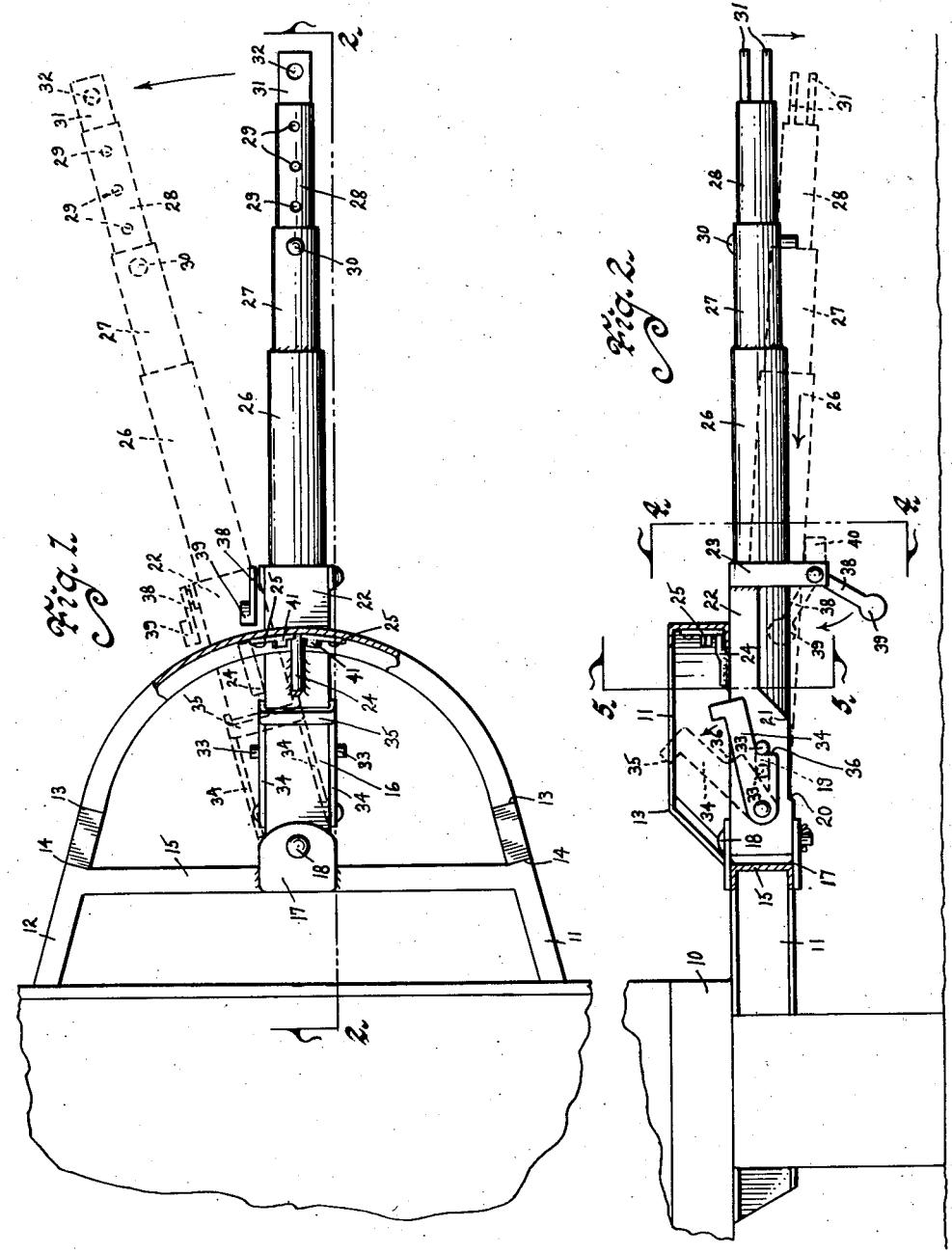
Inventor
Chester I. Leveke
by M. Talbert Dick
Attorney
Witness
Edward P. Seeley

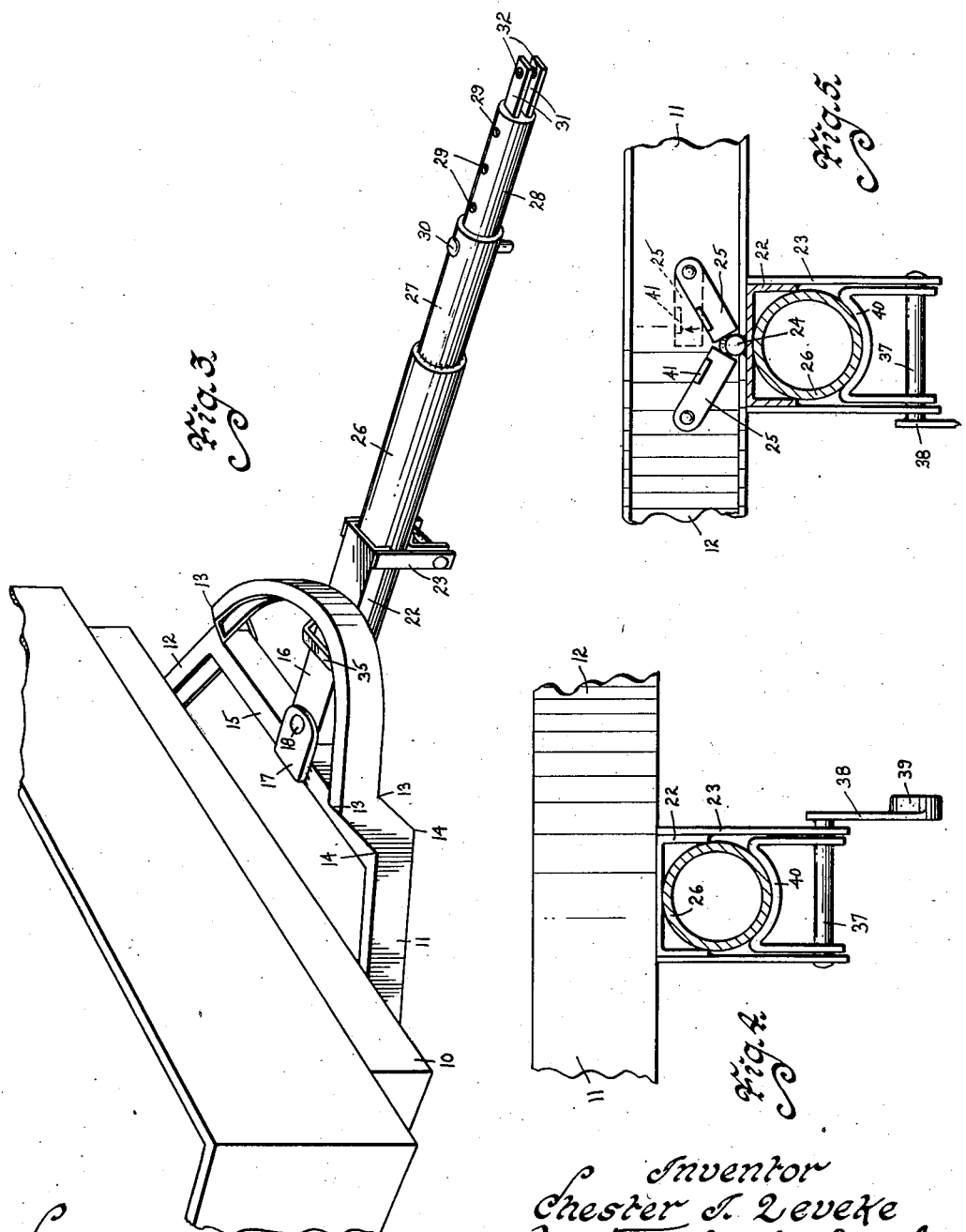

Patented Jan. 15, 1952

2,582,595

UNITED STATES PATENT OFFICE 2,582,595

ADJUSTABLE TONGUE FOR MOTORLESS VEHICLES

Chester I. Leveke, Des Moines, Iowa

Application October 31, 1949, Serial No. 124,657

5 Claims. (Cl. 280—33.44)

1

My invention relates to a tongue for a motorless vehicle and more particularly to such a tongue that is capable of adjustable movement when being secured to a prime mover such as a tractor, truck or like.

All motorless vehicles such as trailers, wagons, or the like that must be moved by a prime mover are provided with some means for detachably securing the same thereto. A substantial portion of such means consist of a tongue that can be secured to a hitch on the prime mover. This is usually accomplished by backing up the prime mover such as a truck, automobile, tractor or the like to a point where the tongue can be secured in the hitch. With small light weight trailers this is not too much of a task because if the truck is not backed up exactly to the right spot, the light trailer can be manhandled sufficiently to set the end of the tongue in the hitch. However, in a great number of cases the trailer is far too heavy for such maneuvering and if the truck is not moved to the correct position the first time, it must be moved and maneuvered again until the end of the tongue falls exactly into place in the hitch. Usually the end tongue when not secured in the hitch will be resting on the ground so that in addition to a driver for the prime mover, another person is needed to hold the tongue in a position higher than the hitch. Often it requires repeated maneuvering of the truck to back into just the right spot for this hook-up due to the fact that the tongue is attached to the wheel runner of the trailer and it is therefore practically impossible on a large trailer to move the tongue laterally to compensate for any slight error in backing the truck. This can, and frequently does, consume a lot of valuable time and effort especially when the prime mover itself is large and bulky.

It is therefore an object of my invention to provide a tongue for trailers or the like that is capable of lateral, vertical and horizontal adjustment to expedite and facilitate its attachment to and detachment from the hitch of a prime mover.

A further object of this invention is to provide a trailer tongue of the above class that has a plurality of adjustable means to accomplish the purpose set out above but which when secured to a prime mover provides a sturdy, rigid and efficient tongue.

A still further object of this invention is to provide a trailer tongue having a plurality of manually operable adjustable means to expedite and facilitate its attachment to the hitch on a prime mover and which means will automatically lock the tongue rigidly in place when the hook-up is completed and a pulling force has been exerted by the prime mover.

A still further object of my invention is to

2 provide an adjustable tongue for trailers or the like that requires only one person for hooking it to a prime mover and that does not require the use of any tools therefor.

A still further object of this invention is to provide a trailer tongue of the above classes that is economical in manufacture, efficient in use and durable in construction.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top view of this device shown attached to the frame of a trailer or the like with the dotted lines indicating the lateral movement thereof, Fig. 2 is a side view of this device taken on the line 2—2 of Fig. 1, with the respective dotted lines showing different positions of the respective parts thereto, Fig. 3 is a perspective view of my tongue attached to the frame of a trailer or the like and ready for use, Fig. 4 is a cross-sectional view of this device taken on the line 4—4 of Fig. 2, and Fig. 5 is a cross-sectional view of this device taken on the line 5—5 of Fig. 2.

Referring to the drawings I have used the numeral 10 to designate the front end of the frame for a motorless vehicle such as a trailer, wagon or the like. I have made my tongue frame from a length of angle iron which is bent at its center into substantially a U-shape having the respective length portions 11 and 12 which extend rearwardly, horizontally and slightly away from each other to the bend points 13. From the bend points 13, the lengths 11 and 12 extend downwardly, rearwardly, forwardly and slightly away from each other to the bend points 14 and thence rearwardly, horizontally and slightly away from each other to the respective ends thereof which are secured to the frame 10, as shown in Fig. 1. Transversely arranged within the tongue frame is the bar brace 15 which has its respective ends secured to the length portions 11 and 12 respectively at a point just to the rear of the bend points 14.

Thus arranged, the front U portion of the tongue frame that is forward of the bend points 13 and 14 is at a higher elevation that the lengths 11 and 12 which are to the rear of these bend points and by this construction the bottom of the U portion is substantially on the same horizontal plane as the top of the brace 15 to provide for the tongue member which will later be described in detail.

The numeral 16 designates an elongated rectangular housing member that is pivotally secured at its rear end to the brace 15 by any suitable means such as the bearing bracket 17 and pin 18, as shown in Fig. 1. On each side of the housing 16 I provide the elongated horizontal slots 19. Forwardly from the point 20 on the bottom of the housing 16 the bottom thereof is open and forwardly from the point 21 thereon, a portion of each side of the housing 16 is also open to form the reduced forward housing portion 22, as shown in Fig. 2. Secured to the forward end of the reduced housing portion 22 is a bar bracket 23 which engages the top and sides thereof with its free ends extending in spaced relation downwardly to a point below the bottom of the housing 16, as shown in Fig. 2 and Fig. 4.

The reduced housing portion 22 extends under and forwardly of the U portion of the tongue frame, as shown in Fig. 1 and Fig. 3 and is laterally movable without interference from the U portion. This is possible because of the elevated position of the U portion previously described.

The numeral 24 designates an elongated stop rod member secured to the top of the reduced housing portion 22 so that the forward end portion thereof rests on and is slidable on the horizontal section of the angle iron U portion of the tongue frame, as shown in Fig. 1. The numeral 25 designates two spaced apart elongated bar catch members, each pivotally secured at one end to and adjacent the inside vertical section of the tongue frame U portion and arranged so that the free end of each catch is capable of engaging one side of the stop bar 24 at times, as shown in Fig. 5. Each of the catches 25 is provided with the finger tip grip members 41.

The numeral 26 designates an elongated tongue member which I have formed from a length of pipe. While I show a reduced forward portion 27 in the drawings the portions 26 and 27 can be made from one piece of material without affecting the use of this device. The numeral 28 designates an adjustable detachable elongated tongue portion that is provided with a plurality of spaced apart holes 29 arranged in line along the longitudinal axis thereof, as shown in Fig. 1. This portion 28 is made to telescope into the tongue portion 27 and is adjustable as to length by inserting the pin 30 into any desired hole 29. Secured to the free end of the tongue portion 28 and extending forwardly therefrom are two parallel bar members 31 arranged in vertical spaced relation and each provided with the corresponding holes 32. Near the rear of the tongue member 26 there is transversely arranged and secured therein a rod member which projects outwardly from each side of the tongue 26 to form the lug tips 33. The entire tongue assembly just described is arranged in the housing 16 so that one of the lugs 33 slidably rests in one of the slots 19, as shown in Fig. 1 and Fig. 2.

The numeral 34 designates two elongated catch release bar members respectively pivotally secured at their rear end to one side respectively of the housing 16 at a point just rearwardly of the slots 19 and joined together at their forward end by the elevated hand grip bar 35. The bottom edge of each of the catch release bars is provided with the shoulder 36 as shown in Fig. 2.

The numeral 37 designates a shaft member pivotally secured to the free ends of the bracket 23 and having a lever handle member 38 secured to one end. This handle 38 is provided with a weighted knob end 39. The numeral 40 designates a cradle member secured to said shaft 37 between the free ends of the bracket 23, as shown in Fig. 4 and Fig. 5.

Thus constructed and arranged, this tongue will operate in the following manner:

The tongue frame is normally secured to the trailer or the like at a standard height from the ground. This tongue 26 will remain in this elevated position without requiring a person to hold it because of my novel arrangement to-wit: The lugs 33 on the rear of the tongue 26 are resting in the slots 19 of the housing 16 and any tendency of the front end of the tongue to drop downwardly is prevented by the inside of the top of the housing 16 which will permit only a slight upwardly movement of the rear end of the tongue 26 to allow a limited vertical movement of the tongue, as shown by the dotted lines in Fig. 2.

Such a vertical movement, however, is controllable by the cradle 40 and when the cradle is positioned as shown in Fig. 4 with the lever handle 38 in its downwardly vertical position, the tongue 26 will be resting on and supported by this cradle and the tongue will be incapable of any vertical movement. With the tongue thus sustained in an elevated position the operator of the prime mover can back his truck or the like so that the hitch on the truck and the end of the tongue are as close together as he can gauge from the driver's compartment. When this has been accomplished the driver can then complete the hook-up himself because of the adjustable features of my invention. A slight vertical adjustment of the tongue is made possible by manually pulling the lever handle 38 to its upwardly position, as shown by the dotted lines in Fig. 5. This movement of the handle 38 will cause the cradle 40 to move forwardly and downwardly since the cradle legs are secured to the shaft 37 which turns with the handle 38. The removal of the cradle 40 from beneath the tongue 26 will provide whatever vertical adjustment of the tongue that will normally be required. The adjustment as to length can be made in two different ways: First, any small variation in the length of the tongue can be obtained by manually raising the catch releases 34 by means of the cross bar 35. Normally the shoulders 36 on these releases when in their lowered position will engage the rear of the lugs 33 to prevent any rearwardly movement of the tongue 26. However, when the releases 34 are raised and the shoulders 36 are clear of the lugs 33 the lugs can be slid back and forth within the slots 19 to obtain any slight variation in the length of the tongue necessary. Any such variation greater than the length of the slots 19 can be obtained by adjusting the tongue end 28 in one of the holes 29. Since the tongue before it is hooked up is not subject to any stresses or strains, all these adjustments can easily and quickly be manually made by one person without the need for any tools.

A lateral adjustment for the tongue is accomplished by raising each of the catches 25 by means of the fingertip grip means 41. These catches must be raised enough so that no lateral obstruction remains in the way of the stop rod 24 and when this is done the tongue can manually be moved laterally to right or left as desired because the tongue is arranged in the housing 16 and the housing is pivotally secured to the brace 15 by means of the bracket 17 and pin 18. As the tongue is laterally moved, the stop rod 24 will ride over the horizontal portion of the angle iron U portion of the tongue frame.

Thus, by using one or more or all of the adjustable features of this device this tongue can easily and quickly be hooked to a prime mover with a great deal of time saved over the procedure now generally in use. Once the tongue is hooked to the prime mover a slight forward movement of the truck will pull on the tongue and as this happens the lugs 33 will move to their forward position in the slots 19 and the releases 34 will drop by gravity into place so that the shoulders 36 engage the lugs 33 and prevent any rearwardly movement thereof. The catches 25 will likewise drop by gravity into place so that the independent lateral movement of the tongue 26 and housing 16 is not permitted.

The cradle 40 will also automatically return to its normal position of supporting the tongue 26 and this is accomplished as follows: As described above the handle 38 is provided with a weighted knob handle 39. When the handle is up and the tongue is resting in its downwardly position, as shown by the dotted lines in Fig. 2, the handle is past its dead center point and consequently will stay up. However, as the tongue is raised to the horizontal and hooked into the prime mover hitch, the dead center position of the handle 38 is changed and the handle by its own weight will drop downwardly, thus returning the cradle to the position shown in Fig. 4. The cradle 40 is arranged so that it will have sufficient clearance between itself and the bottom of the tongue 26 to permit it to freely swing into place as the handle falls by gravity.

Some changes may be made in the construction and arrangement of my adjustable tongue for a motorless vehicle without departing from the real spirit and purpose of my invention, and it is my intention to cover by my claims, any modified forms of structure or use of mechanical equivalents which may be reasonably included within their scope.

I claim:

1. In a device of the class described, a frame member comprising a substantially U-shaped bar member, a brace member transversely arranged within and secured to the respective side portions of said U bar member, a rectangular housing member pivotally secured at one end to said brace member; said housing provided with an open bottom portion, a tongue member pivotally secured at one end within said housing member; said tongue member capable of lateral movement and also capable of vertical movement, a means to restrict the lateral movement of said tongue, a means to restrict the vertical movement of said tongue, a means for adjusting said tongue member as to length and a hitch means secured to the free end of said tongue member.

2. In a device of the class described, a frame member, a housing member pivotally secured at one end to said frame member, an elongated tongue member adjustable as to length at one end and pivotally secured at its other end within said housing member; said tongue member capable of lateral movement and also capable of vertical movement, a means to restrict the lateral movement of said tongue, a manually operable cradle means to restrict the vertical movement of said tongue, a means for adjusting said tongue member as to length and a hitch means secured to the free end of said tongue member.

3. In a device of the class described, a horizontal frame member comprising, a substantially U-shaped bar frame member, a brace member transversely arranged within and secured to the respective side portions of said U-bar member, an elongated rectangular housing member horizontally arranged and pivotally secured at one end to said brace member; said housing provided with an open bottom portion and also provided with a slot on each respective side thereof, an elongated tongue member adjustable as to length on one end, a lug member transversely secured to and laterally projecting from each respective side of the other end of said tongue member; said tongue member detachably secured within said housing member so that each of said lug members slidably rests in one of said slots, a catch release member pivotally mounted on said housing and capable of engaging said lugs to prevent any rearwardly movement thereof and capable of being disengaged from said lugs to permit a rearwardly or forwardly movement of said lugs, a stop rod member secured to the top of said housing member and slidably resting on said frame member, a catch member arranged on said frame member capable of engaging said stop rod member, a cradle member mounted on the underside of said housing member and capable of supporting said tongue member and a hitch means secured to the free end of said tongue member.

4. In a support cradle for the tongue of a vehicle, a bracket member spaced apart at its bottom and designed to be secured at its top to a supporting member; said bracket member embracing said tongue, a shaft member rotatably transversely arranged in the bottom portion of said bracket member, a handle member secured to said shaft member, a cradle member secured to said shaft member and capable of supporting said tongue; said cradle member movable with said shaft member so that rotation of said handle member secured to said shaft member will move said cradle member into or out of its supporting position for said tongue and said cradle member when not supporting said tongue capable of automatically returning to said supporting position.

5. In a device of the class described, a frame member, a housing member pivotally secured at one end to said frame member, an elongated tongue member adjustable as to length at one end and slidably pivotally arranged at its other end within said housing member, means to restrict the slidable movement of said elongated tongue member within said housing member; said tongue member capable of lateral movement and also capable of vertical movement, a means to restrict the lateral movement of said tongue, a manually operable cradle means to restrict the vertical movement of said tongue, a means for adjusting said tongue member as to length and a hitch means secured to the free end of said tongue member.

CHESTER I. LEVEKE.

REFERENCES CITED

The following references are of record in the file of this patent:

UNITED STATES PATENTS

| Number | Name | Date |
| --- | --- | --- |
| 1,570,737 | Furler | Jan. 26, 1926 |
| 1,574,351 | Altgelt | Feb. 23, 1926 |
| 1,838,865 | Paul | Dec. 29, 1931 |
| 2,357,540 | Palmer | Sept. 5, 1944 |